M. PEREZ.
AUTOMOBILE TIRE.
APPLICATION FILED AUG. 11, 1914.
1,152,902.
Patented Sept. 7, 1915.
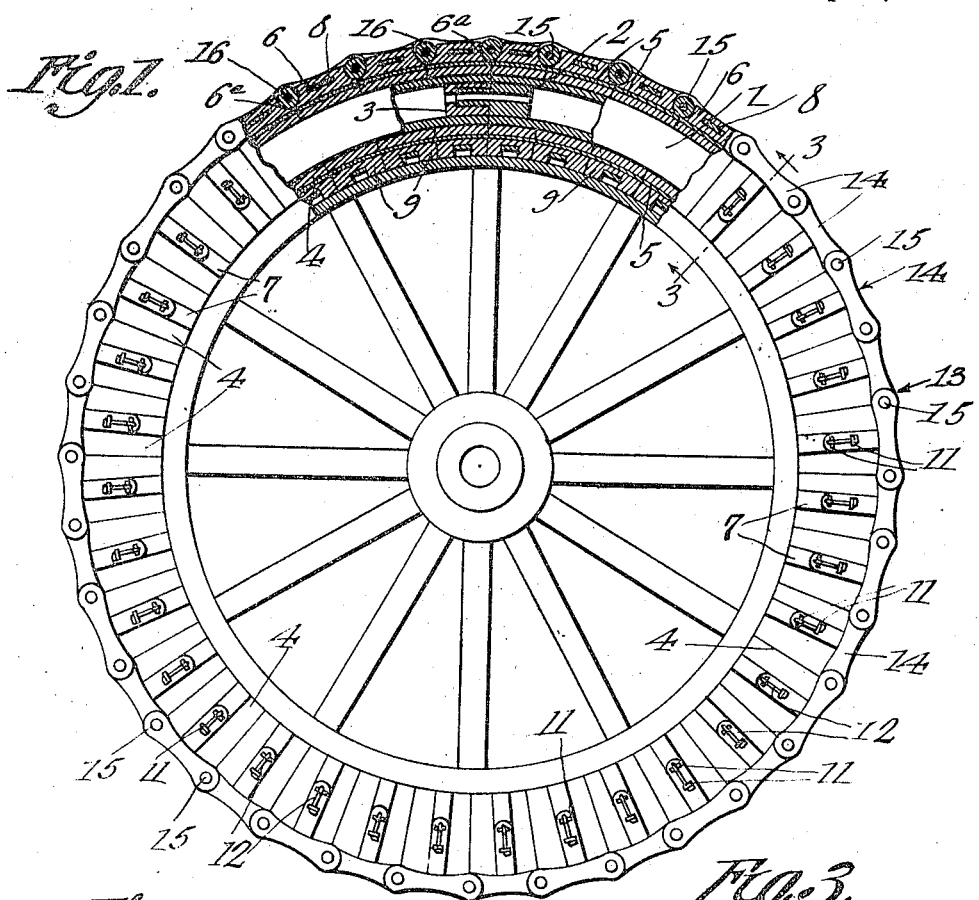
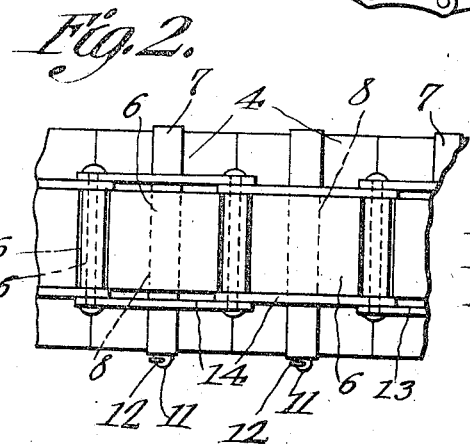
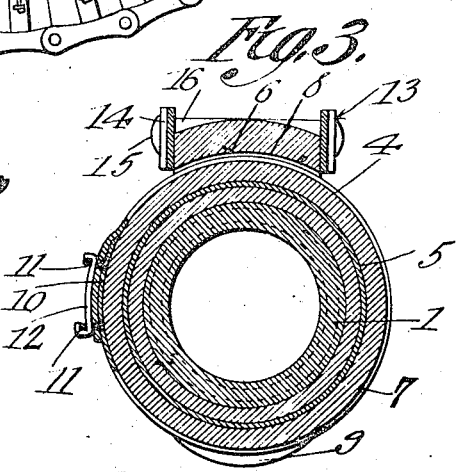
Witnesses
M. Perez
Inventor
by
Attorneys

UNITED STATES PATENT OFFICE.

MIGUEL PEREZ, OF CHICAGO, ILLINOIS.

AUTOMOBILE-TIRE.

1,152,902. Specification of Letters Patent. Patented Sept. 7, 1915.

Application filed August 11, 1914. Serial No. 856,258.

*To all whom it may concern:*

Be it known that I, MIGUEL PEREZ, a citizen of the United States, residing at Chicago, in the county of Cook and State of Illinois, have invented a new and useful Automobile-Tire, of which the following is a specification.

The present invention appertains to automobile tires, and aims to provide a resilient vehicle tire of novel and improved construction.

The present invention contemplates the provision of a unique resilient tire embodying the desirable qualities of a pneumatic tire, but which, at the same time, will be much more durable and which will have a greater tractive effort than the ordinary pneumatic tire.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawings, wherein:—

Figure 1 is a side elevation of one form of the improved tire, portions being broken away. Fig. 2 is an enlarged fragmental view of the tread portion of the tire. Fig. 3 is an enlarged cross section of the tire taken on the line 3—3 of Fig. 1.

In carrying out the present invention there is provided an inner tube 1 bent into annular form, and having the male and female coupling members 2 and 3 secured within its ends and adapted to be threaded or otherwise interengaged to hold the ends of the inner tube 1 secured together. The inner tube 1 is preferably constructed of rubber or other resilient material which is comparatively firm, and the tube 1 is preferably reinforced so that it will be quite strong and firm to resist the strains and pressures to which it is subjected in use, but to enable the inner tube to bend and flex readily when necessary.

Surrounding the inner tube 1, is an annular sheath or casing embodying a plurality or series of sections or annular shoes 4, which are constructed of rubber or similar flexible material of comparatively firm quality to properly support the wheel and permit proper relief when the tire encounters obstructions. Each of the sections or rings 4 has embedded therein, suitable reinforcing material 5 to render the sections or shoes 4 durable and substantial.

The sections or shoes 4 are provided with outer lugs 6, and metallic bands or strips 7 embrace the sections 4, the lugs 6 being provided with slots 8 through their basal portions for the passage of the bands 7, while the inner portions of the sections 4 are provided with spaced lips or flanges 9 between which the bands 7 rest, to hold the bands in place. As illustrated, the ends of the bands 7 are located at one side of the tire, and are overlapped, the inner end portions 10 being provided with apertured ears 11 engaging through the outer end portions, and pins or wire 12 being engaged through the apertured ears 11 and having their terminals hooked or bent to hold them in place, and to hold the overlapped ends of the bands 7 assembled.

Embracing the casing or sheath comprising the sections 4, is an annular chain 13, constituting the side links 14 having their ends pivotally connected by the cross pins or rivets 15 upon which are mounted the tubular anti-frictional members or rollers 16. The adjacent ends of the lugs 6 are provided with grooves or curved rabbets 6ª for receiving the tubular members 16 of the tread chain 13, the links 14 of the chain being disposed at the opposite sides of the lugs 6, whereby the chain will be held in place. It is evident that the chain may yield in the plane of the wheel, with the casing or sheath and the inner tube, but the chain will resist the lateral strains, as when the tire is subjected to a skidding or lateral strain. The bands 7 are also flexible to yield with the tire, and it will be evident that the tire structure, as a whole, is sufficiently resilient and has sufficient "life" to render the tire sufficiently firm and resilient to supplant the ordinary pneumatic tire without losing the benefits thereof. The bands 7 serve as bearings for the chain 13 to reduce the wear on the sections 4, and also hold the sections 4 tightly upon the tube 1. The present tire is also capable of withstanding great wear and tear, to increase the life thereof, and due to the provision of the tread lugs 6, and the tread chain 13, the tractive effort of the tire will be enhanced materially.

Having thus described the invention, what is claimed as new is:—

A vehicle tire comprising an inner tube, a casing mounted thereon and including a plurality of annular sections each having an outer lug provided with a slot therethrough, a band embracing each of the casing sections and passing through the slot of the corresponding lug, and a tread chain surrounding the casing and engaged over the said lugs.

In testimony that I claim the foregoing as my own, I have hereto affixed my signature in the presence of two witnesses.

MIGUEL PEREZ.

Witnesses:
SOL NATHANSON,
HECTOR DURANTE.